Feb. 26, 1963  D. G. THOMAS  3,078,966

DAMPER

Filed July 3, 1961

INVENTOR.
David G. Thomas
BY
Ralph Hammar
Attorney

3,078,966
DAMPER

David G. Thomas, Erie, Pa., assignor to Lord Manufacturing Company, Erie, Pa., a corporation of Pennsylvania
Filed July 3, 1961, Ser. No. 121,649
1 Claim. (Cl. 188—88)

This invention is a damper for introducing resistance proportional to the velocity of relative movement between two parts. The resistance is obtained by squeezing a liquid filled flexible envelope to force liquid through a restriction. In a preferred form, the envelope is carried by one of the relatively movable parts and the other part makes constrictive engagement with an intermediate portion of the envelope.

Figure 1:
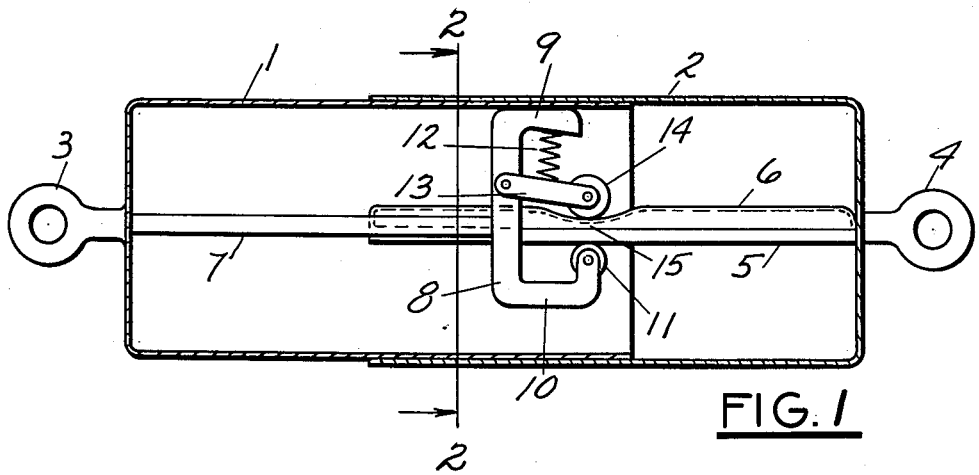
Figure 3:
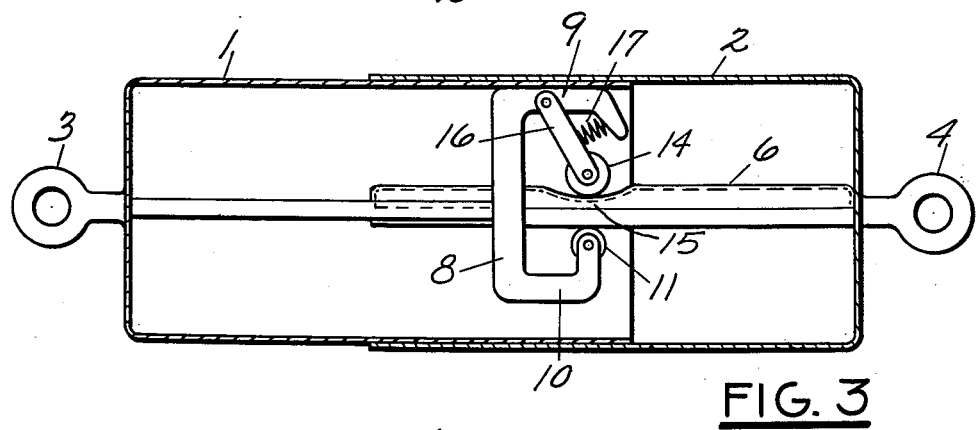
Figure 2:
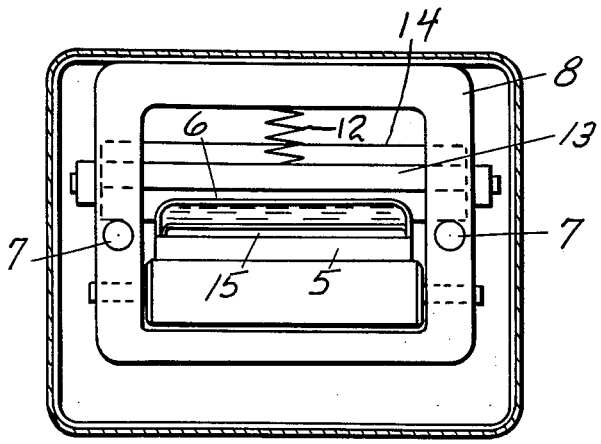

In the drawing, FIG. 1 is a longitudinal section through a preferred form of damper, FIG. 2 is a section on line 2—2 of FIG. 1, and FIG. 3 is a longitudinal section through a modification.

In the drawing, 1 and 2 indicate the relatively movable parts between which resistance is to be introduced. These parts are in the form of telescoping cup shaped members, such as used in shock absorbers and the parts are respectively provided with an eye 3, 4 by which the parts may be connected to resist movement between relatively movable structures.

The part 2 is fixed to a longtitudinally extending plate 5 on the upper surface of which is bonded a flexible envelope 6, preferably of non-stretchable material such as rubber or plastic coated or impregnated fabric. Preferably, the envelope is limp and inelastic. Urethane coated "Dacron" fabric is an example of inelastic material. If the envelope is elastic, it stretches and limits the damping at high velocity motions. The other part 1 is connected by rods to a yoke 8 having arms 9 and 10 respectively above and below the plate 5. The arm 10 carries a roller 11 which rides on the under surface of the plate 5. A spring 12 arranged between the arm 9 and a link 13 pivoted on the yoke urges a roller 14 against the upper side of the envelope and squeezes the envelope toward the plate 5 to provide a restrictive passageway 15. As the parts 1 and 2 are reciprocated relative to each other, the liquid in the envelope is forced through the restricted passageway 15 and thereby provides a damping resistance proportional to the velocity of the relative movement. The magnitude of the damping force is controlled by the size of the restricted passageway 15, the smaller the passageway, the greater the resistance. The spring 12 limits the maximum amount of damping. A rigid connection could be substituted for the spring if limitation of the damping were not desired.

The envelope is preferably filled with liquid after the parts are assembled so that the envelope assumes its natural position.

In the modification of FIG. 3, the damper offers greater restraint in one direction than in the opposite direction. This is accomplished by carrying the roller 14 on a link 16 pivoted on the arm 9. The length of the link 16 is such that it is inclined at an acute angle to the upper surface of the envelope 6. A spring 17 urges the roller 14 into contact with the envelope. As the yoke 8 moves to the left, the resistance to movement of the roller 14 tends to pivot the link 16 in the direction to open up the restriction within the envelope and thereby decrease the damping. As the yoke moves to the right, the resistance to movement of the roller 14 supplements the spring 17 in forcing the roller against the envelope and thereby decreases the restriction and increases the damping. The modification of FIG. 3 is useful in applications where the damping in one direction should be greater than in the opposite direction. One such application is in automobile shock absorbers.

What is claimed as new is:

A damper for introducing resistance to relative movement, comprising a member, a liquid filled flexible walled envelope fixed to said member, another member movable in a direction along said envelope, a roller extending transverse to said direction and engaging an intermediate portion of said envelope and squeezing the same to provide a restriction to the flow of liquid, a link, a hinge at one end of the link supporting the link for movement in said direction, means journaling the roller on the free end of the link, said link extending from said hinge toward the roller at an acute angle so the resistance offered to movement of the roller tends to swing the link about its hinge and thereby vary the pressure exerted by the roller on the envelope, and spring means for urging the link in the direction to move the roller toward the envelope.

References Cited in the file of this patent

UNITED STATES PATENTS

| 489,193 | Mills | Jan. 3, 1893 |
|---|---|---|
| 1,121,476 | Chipley | Dec. 15, 1914 |
| 2,088,875 | Serste | Aug. 3, 1937 |
| 2,314,493 | Guy | Mar. 23, 1943 |
| 2,905,430 | Deist | Sept. 22, 1959 |
| 2,930,455 | Williams | Mar. 29, 1960 |
| 2,961,233 | Ullrich | Nov. 22, 1960 |

FOREIGN PATENTS

| 1,103,491 | France | May 25, 1955 |